United States Patent
Kim et al.

(10) Patent No.: US 8,406,752 B2
(45) Date of Patent: Mar. 26, 2013

(54) MOBILE TERMINAL AND CONTROLLING METHOD THEREOF

(75) Inventors: Minjoo Kim, Seoul (KR); Isu Byun, Seoul (KR); Jiwoon Kim, Seoul (KR); Sanghyuk Lee, Bucheon-si (KR); Inyong Hwang, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 13/213,810

(22) Filed: Aug. 19, 2011

(65) Prior Publication Data
US 2012/0064882 A1   Mar. 15, 2012

(30) Foreign Application Priority Data
Sep. 15, 2010   (KR) .................. 10-2010-0090440

(51) Int. Cl.
*H04M 3/00* (2006.01)

(52) U.S. Cl. .................. 455/418; 455/566; 455/466
(58) Field of Classification Search .................. 455/566, 455/418, 466
See application file for complete search history.

(56) References Cited

U.S. PATENT DOCUMENTS

2003/0233419 A1* 12/2003 Beringer .................. 709/206
2006/0211435 A1*  9/2006 Nielsen et al. .............. 455/466

* cited by examiner

*Primary Examiner* — Vladimir Magloire
(74) *Attorney, Agent, or Firm* — Birch, Stewart, Kolasch & Birch, LLP

(57) ABSTRACT

A mobile terminal including a wireless communication unit; a touchscreen configured to display an input menu for inputting information and including an input option displayed as a thumbnail representing input items that can be selected; and a controller configured to automatically provide candidate options to be input into a selected second input field based on characteristics of an input item input into the first input field.

20 Claims, 11 Drawing Sheets

(a)　　　　　　　　(b)

MOBILE TERMINAL AND CONTROLLING METHOD THEREOF

Pursuant to 35 U.S.C. §119(a), this application claims the benefit of earlier filing date and right of priority to Korean Patent Application No. 10-2010-0090440, filed on Sep. 15, 2010, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, when an information input mode including a plurality of input items is selected, if information is input to one of the input items, it is particularly suitable for performing an information input of another input item efficiently by displaying candidate input information related to the input information.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

However, in a message writing input mode, for example, inputting items is also tedious and cumbersome especially with a small display size. In addition, a user must directly input information to each input item or performs a search to find an appropriate content. Therefore, the demand for a method of enhancing theses problems is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof. According to the object of the present invention, when an information input mode including a plurality of input items is selected, if information is input one of the input items, an information input of another input item is facilitated in a manner of displaying candidate input information related to the input information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display an input menu, in which at least one or more input options for inputting information to a plurality of input items are arranged as thumbnails, on a first region and a controller, when the input menu is displayed on the touchscreen, if the thumbnail corresponding to one of the at least one or more input options is selected via the input menu, controlling the input option corresponding to the selected thumbnail to be displayed on a second region, the controller controlling the information to be input to at least one of a plurality of the input items via the selected input option.

In another aspect of the present invention, a method of controlling a mobile terminal includes displaying a plurality of input items on a prescribed information input mode, inputting information to a first input item among a plurality of the input items via a touchscreen, activating a second input item into an information inputtable state by selecting the second input item, displaying candidate input information on the second input item among the information related to the input first input item information on the touchscreen, selecting at least one of the candidate input information via the touchscreen, and inputting the selected information to the second input item.

Accordingly, the present invention provides the following effects and/or advantages.

First of all, when an information input mode including a plurality of input items is selected, if information is input one of the input items, a mobile terminal according to at least one embodiment of the present invention facilitates an information input of another input item efficiently by displaying candidate input information related to the input information.

Secondly, a mobile terminal according to another embodiment of the present invention arranges candidate input information in form of a prescribed pattern according to a frequency of user's executions, thereby enabling information to be quickly input to other input items.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
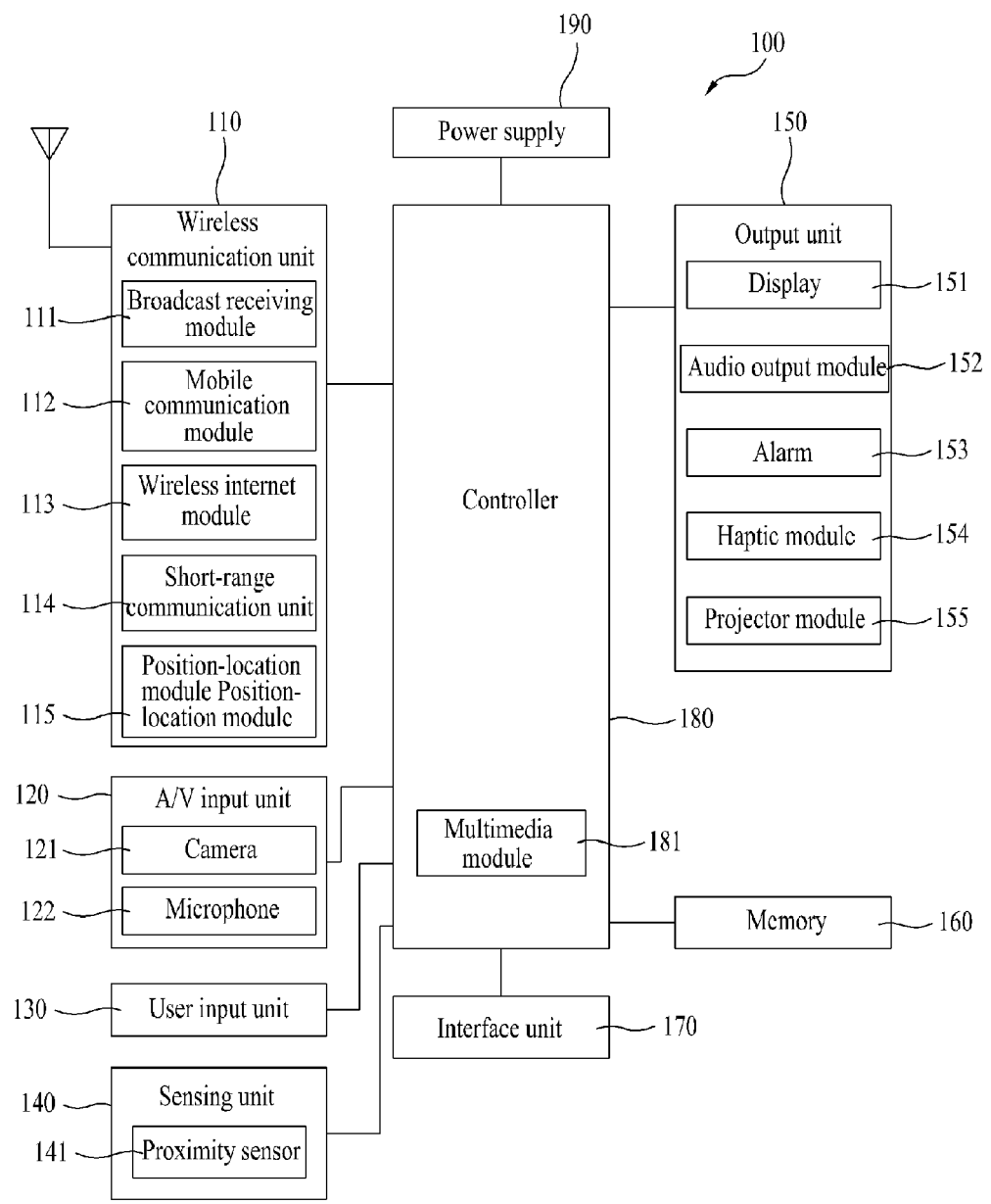
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultrawideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1, the proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor 141 has a durability longer than that of a contact type sensor and also has utility wider than that of the contact type sensor.

The proximity sensor 141 can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the option of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
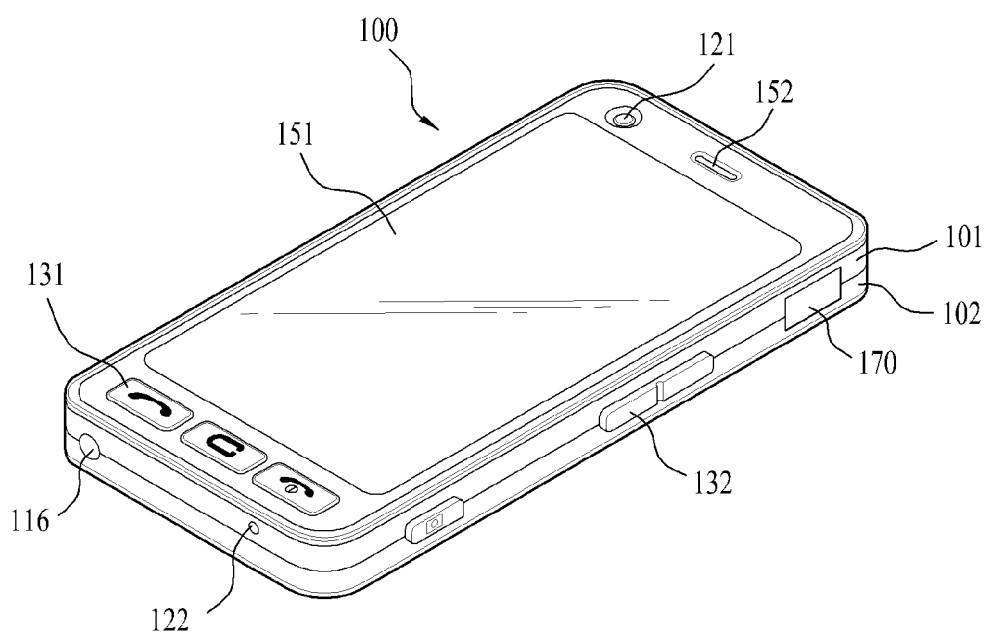
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any option of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132. A retractable antenna 116 can also be provided to the terminal.

Interconnected operational option between the display 151 and the touchpad 135 are explained with reference to FIG. 3 as follows.

Figure 3:
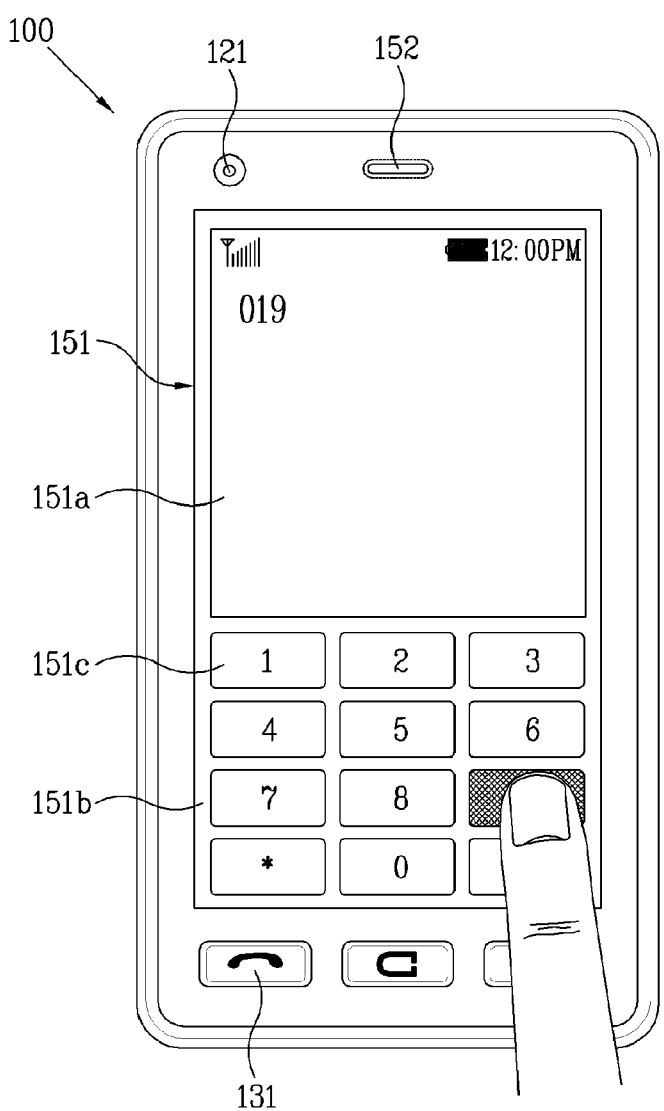
FIG. 3 is a front diagram of a mobile terminal according to one embodiment of the present invention to describe one operative status thereof.

FIG. 3 is a front-view diagram of a terminal according to one embodiment of the present invention for explaining an operational state thereof.

First of all, various kinds of visual information can be displayed on the display 151. In addition, theses information can be displayed in characters, numerals, symbols, graphics, icons and the like.

In order to input the information, at least one of the characters, numerals, symbols, graphics and icons are represented as a single predetermined array to be implemented in a keypad formation. In addition, this keypad formation can be so-called 'soft keys'.

FIG. 3 shows that a touch applied to a soft key is input through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is output to the input window 151b. If the soft key 151c' is touched, a digit corresponding to the touched soft key is output to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

For clarity and convenience of the following description, a mobile terminal mentioned in the following description is assumed as including at least one of the components shown in FIG. 1. Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

First Embodiment

According to one embodiment of the present invention, when an input menu including at least one or more input options for inputting information to a plurality of input items respectively arranged as thumbnail, is displayed on the touchscreen, and if one of the at least one or more input options is selected, the mobile terminal 100 can control information to be input via the selected input option.

In the following description of one embodiment of the present invention, an input menu, an input option and a thumbnail type are described in turn.

First of all, the input menu means a menu including at least one or more input options for inputting information to a plurality of input items. In particular, the input options are arranged as thumbnails in the corresponding menu.

In addition, the thumbnail represents a display region for displaying a prescribed image or menu thereon by reducing the display region in a predetermined ratio. If the input options are arranged as the thumbnails, all of the available input options can be checked at a time. In addition, a user can easily change the input option without a separate setting menu manipulation for the input option change. Moreover, it is not necessary to end a currently executed application.

Each of the input options corresponds to a method supported by the mobile terminal 100 to enable a user to input information to an input item. For instance, the input options include a character input option, a photo input option, a video input option, an audio input option and the like. The input options generally include the character input option for writing a document using a virtual keypad or a hardware keypad. As the use frequency of such multimedia as photo, video, contents, music and the like increases recently, the photo input option via a photographed photo file, the video input option via a photographed video file, the audio input option via a microphone and the like are frequently used. The photo or video input option can be implemented by displaying icons, a list or thumbnails of photos or videos and then selecting at least one object from the displayed objects.

Moreover, the user can select an input option via an input menu in a lock screen state. In this instance, the lock screen state means the state that a touch input is blocked to prevent waste of power if the mobile terminal 100 is not used over a predetermined duration. However, a specific touch input for releasing the lock screen is not blocked in general. If a manipulation for selecting an input option via an input menu is allowed as well as the manipulation for releasing the lock screen, a user can skip the lock screen releasing input process and can quickly change the input option.

In the following description, a process for selecting an input option when displaying an input menu according to one embodiment of the present invention is explained with reference to FIGS. 4(a) and 4(b).

First, the display unit 151 in the following embodiment includes a touchscreen. Moreover, assume that input option available for the present embodiment includes a character input option, a photo input option, a video input option, a voice input option and the like.

Figure 4:
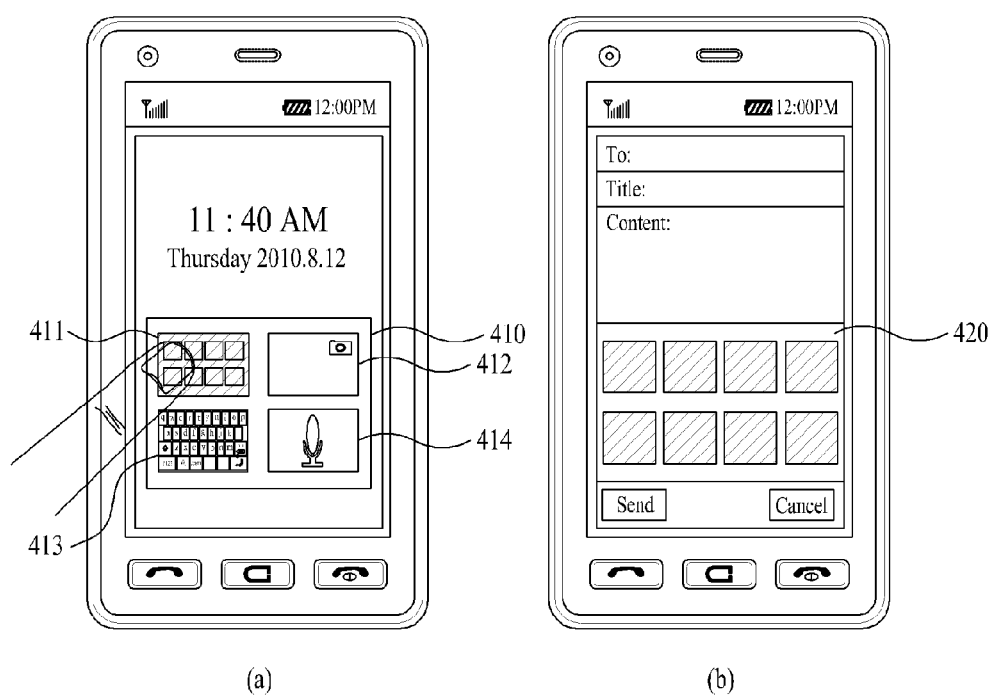
FIG. 4 is a diagram illustrating one example of selecting a photo input option from an input menu and then executing the selected photo input option according to one embodiment of the present invention.

FIG. 4 is a diagram illustrating one example of selecting a photo input option from an input menu and then executing the selected photo input option according to one embodiment of the present invention.

Referring to FIG. 4(a), the mobile terminal 100 stays in a lock screen state. In addition, an input mode 410 including a character input option 411, a photo input option 412, a video input option 413 and a voice input option 414 arranged as thumbnails by being classified according to categories is displayed on a bottom part of the touchscreen.

A user can select the thumbnail of the photo input option 412 from the displayed input option. In this instance, the photo input option can be implemented by arranging photos stored in the mobile terminal 100 as thumbnails at the bottom part of the touchscreen to enable the photo selected by the user to be input to an input item.

If the thumbnail of the photo input option 412 is selected, the photo input option displayed as the thumbnail is displayed as its original shape 420, as shown in FIG. 4(b), on the bottom part of the touchscreen. If the user selects a specific photo to input from the arranged photos and then drags the selected photo to a 'content input item', the dragged photo is input to the content input item. Of course, the photo selection can be performed by a simple touch input as well.

Next, a process for selecting a photo input option in an input mode will be explained with reference to FIGS. 5(a) and 5(b).

Figure 5:
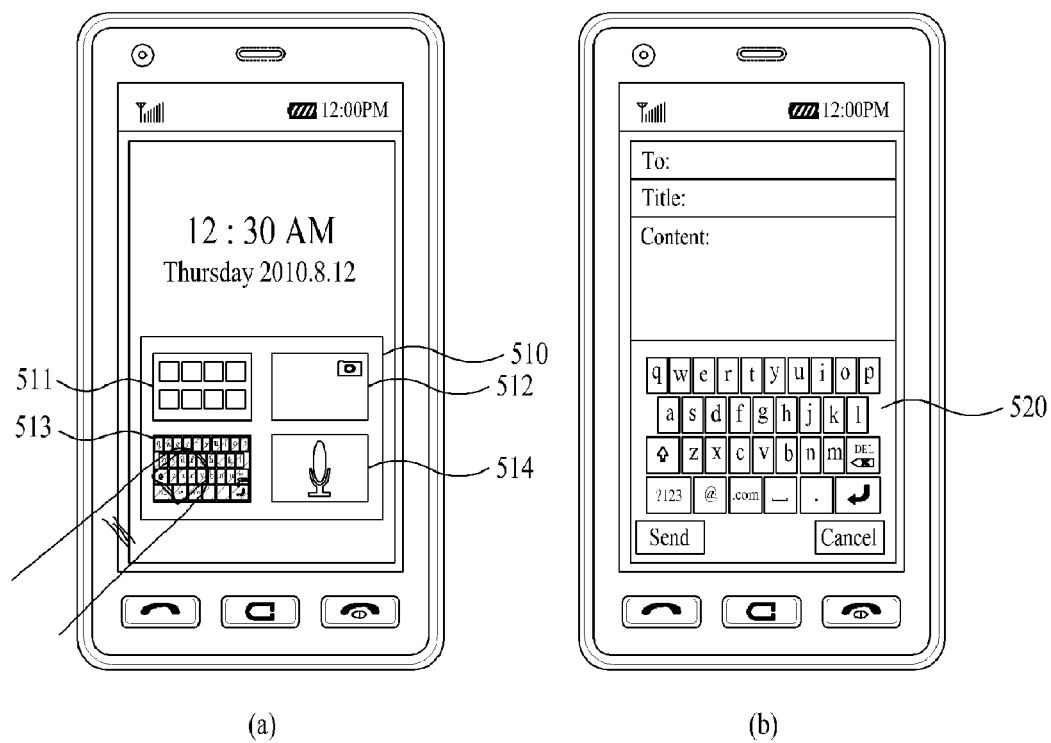
FIG. 5 is a diagram illustrating one example of selecting a character input option from an input menu and then executing the selected photo input option according to one embodiment of the present invention.

FIG. 5 is a diagram illustrating one example of selecting a character input option from an input menu and then executing the selected photo input option according to one embodiment of the present invention.

Referring to FIG. 5(a), a user can select a character input option thumbnail 513 in a lock screen mode. In this instance, the character input option is the way for displaying consonants, vowels, numerals, symbols and the like on a bottom part of the touchscreen and then enabling a user to input a character selected by the user to be input to an input item.

If the character input option thumbnail 513 is selected, referring to FIG. 5(b), the user's information input in an information input mode can be performed via a character input option 520 displayed on the bottom part of the touchscreen.

Therefore, the user can easily set the input option of the mobile terminal 100 via the input menu.

Second Embodiment

According to another embodiment of the present invention, when writing an information input mode including a plurality of input items, if information is input to one of the input items, candidate input information related to the input information are displayed to facilitate an information input to another input item.

For example, the information input mode can include one of an email write mode, an SMS/MMS write mode, a phonebook write mode and the like. For clarity of the following description, the information input mode includes the message write mode.

Generally, even if information is input to one of input items correlated to each other when writing a message, the input information is not utilized for another input item. Instead, a user directly inputs information to the rest of the input items individually or performs a search for an appropriate content.

Therefore, if information on other input items is inputtable via candidate input information related to a previously input information, a user can quickly write a message.

Next, a process for inputting information to another input item via candidate input information related to an input information according to another embodiment of the present invention will be explained in detail with reference to FIG. 6.

Figure 6:
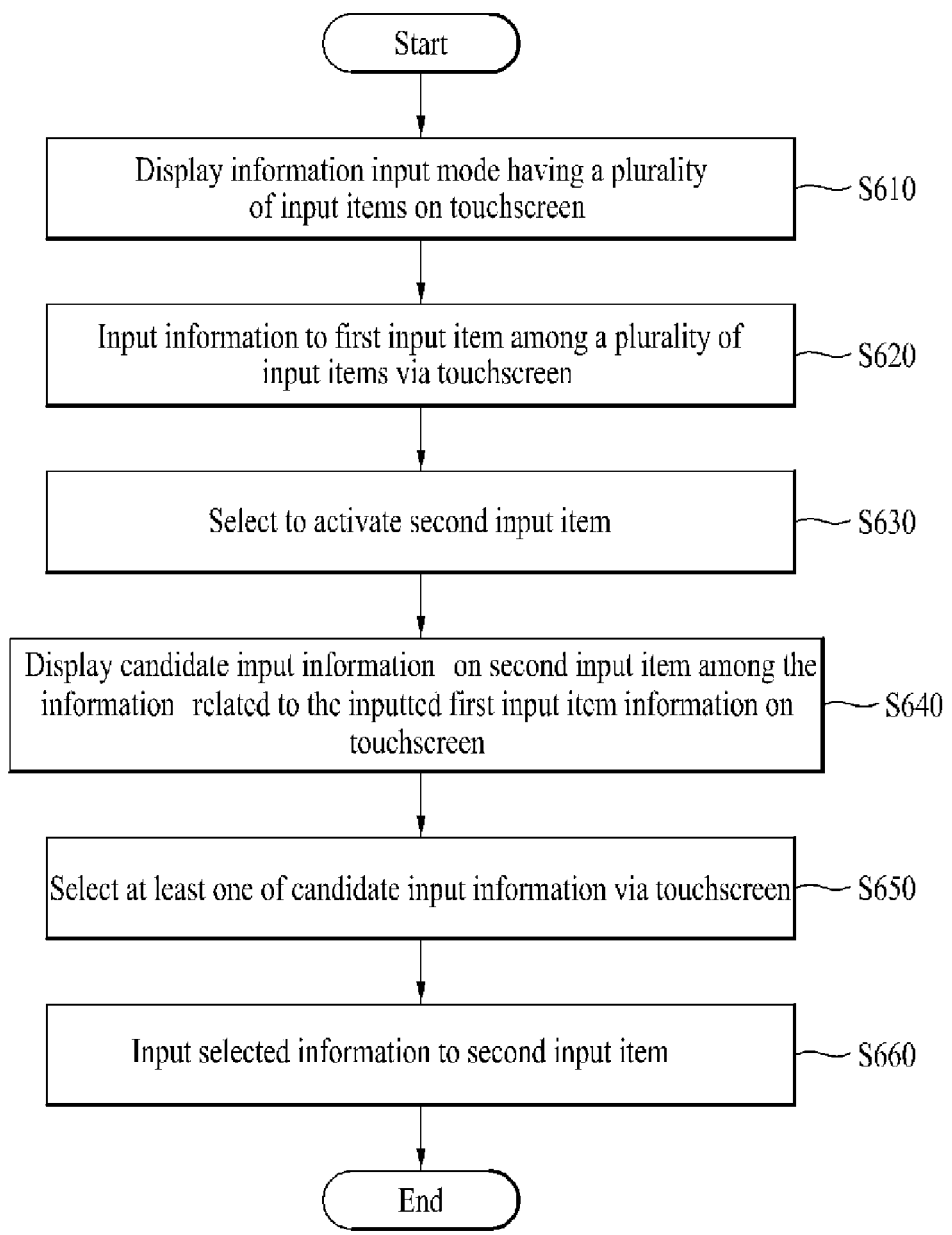
FIG. 6 is a flowchart illustrating one example of inputting information to a second input item via candidate input information related to a first input item information in a mobile terminal according to one embodiment of the present invention.

In particular, FIG. 6 is a flowchart illustrating one example of inputting information to a second input item via candidate input information related to a first input item information in a mobile terminal according to one embodiment of the present invention.

Referring to FIG. 6, an information input mode including a recipient input item, a title input item, a text input item and the like is displayed on the touchscreen (S610). In particular, a user can execute a message write mode. In the message write mode, a plurality of input items used to write a message are displayed and arranged in a prescribed formation.

For example, a plurality of the input items can include a recipient input item, a title input item, a message content input item, an originator input item, an attachment file input item and the like. In addition, the input items are displayed and arranged according to categories.

After a first input item among a plurality of the input items has been activated via the touchscreen, information can be input to the activated first input item (S620). In this instance, the first input item means a single input item on which an input is initially performed among the input items. In addition, a second input item means at least one input item among the input items except the first input item.

Meanwhile, an activated state means the state ready for inputting information if a user selects a prescribed input item to perform an input thereon. For instance, a user selects and activates the first input item via the touchscreen to enable an information inputtable state.

Further, a type of the information input to each input item can vary according to the corresponding input item. For instance, information of a character type can be input to the title input item. In addition, a file to be attached can be specified to the attachment file input item.

Once the information is input to the first input item, the second input item is selected and activated (S630). For instance, a user inputs information by setting the first input item to the message content input item and can then select and activate the recipient input item by setting the second input item to the recipient input item.

If the second input item is activated, candidate input information on the second input item among the information related to the input first input item information are displayed on the touchscreen (S640). In this instance, the candidate input information means the information of a type inputtable to the second input item in association with a keyword information extracted from the first input item information.

The keyword information means the information for determining a content of the information to be input to each input item. For example, the keyword information includes a name, a place, a state, an hour and the like.

The candidate input information are displayed on the touchscreen according to their categories, respectively. In particular, arrangement of the candidate input information can vary according to such a preset priority of a user's use frequency and the like or a category. This shall be explained in more detail later.

Subsequently, at least one information can be selected from the candidate input information via the touchscreen (S650). The selected information is then input to the second input item (S660).

A function of facilitating an information input to another input item by displaying the candidate input information related to the input information according to another embodiment of the present invention will now be explained in more detail with reference to FIGS. 7 to 9.

Figure 7:
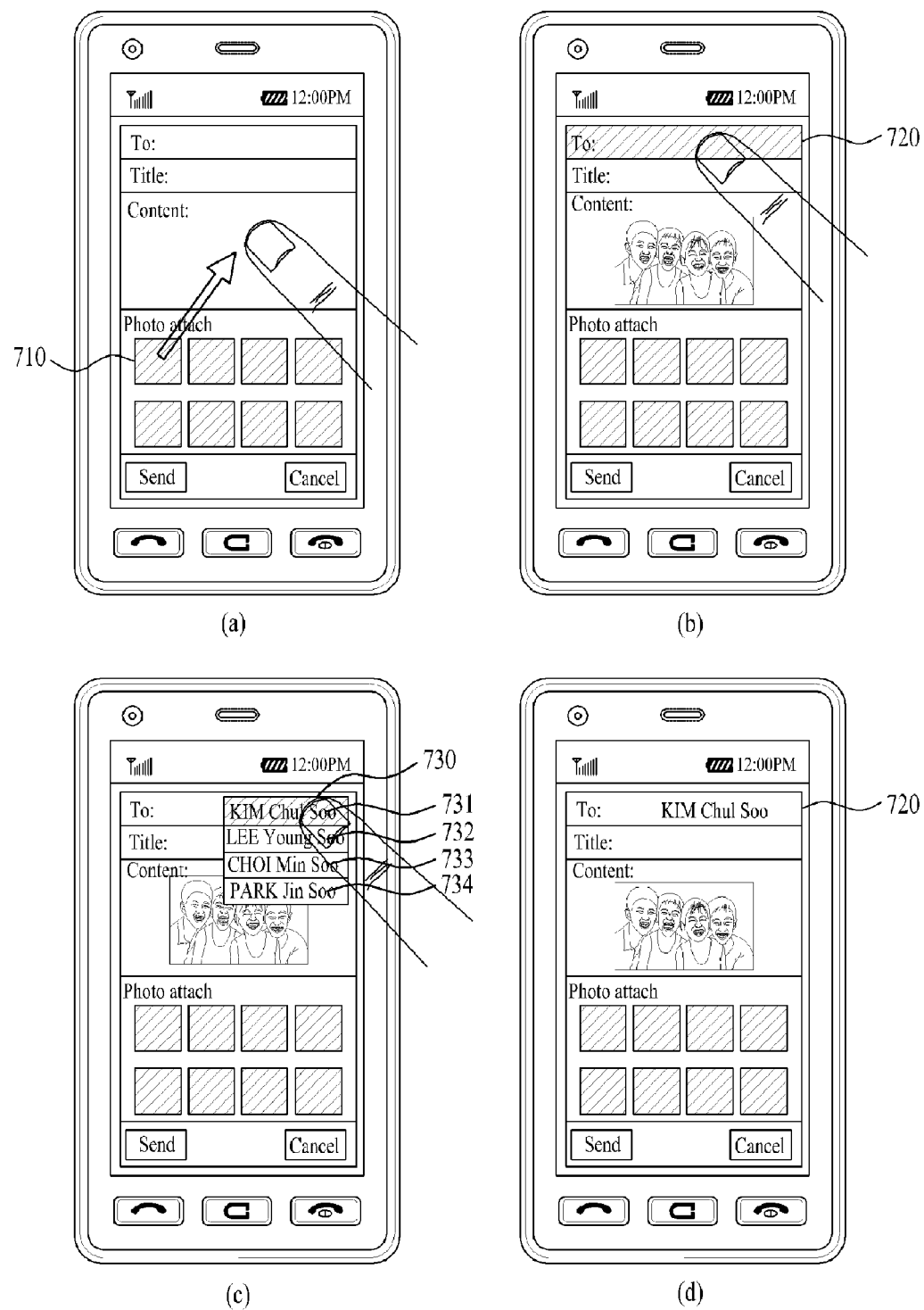
FIG. 7 is a diagram illustrating one example of inputting information to a 'recipient input item' through candidate input information related to a photo input to 'content input item' according to one embodiment of the present invention.

FIG. 7 is a diagram illustrating one example of inputting information to a 'recipient input item' through candidate input information related to a photo input to 'content input item' according to one embodiment of the present invention.

In the following description, the photo input option is selected as an input option. In addition, input items in an information input mode include a recipient input item, a title input item, a message content input item and an originator input item.

Assume that a user is writing input items to send to KIM Chul Soo a message having a photo 710 attached thereto. In addition, assume that a title of the photo 710 is 'KIMChul-Soo_LEEYoungSoo_CHOIMin-Soo_PARKJinSoo_atGwangHwaMun_2 010.8.8.jpg'.

Referring to FIG. 7(*a*), the user drags the photo 710 to a content input item as a first input item via a photo input option. Alternatively, the corresponding input can be performed via an attachment file input item instead of the drag input.

Referring to FIG. 7(*b*), the photo 710 is input to the content input item. Subsequently, the user selects and activates a recipient input item 720 as a second input item. Once the recipient input item 720 is activated, referring to FIG. 7(*c*), keyword information included in a file name of the photo 710 input to the content input item includes KIM Chul Soo, LEE Young Soo, CHOI Min Soo, PARK Jin Soo, at Gwang Hwa Mun, and 2010.8.8.

In association with a name information that is a type information inputtable to the recipient input item 720 among the keyword information, the names of KIM Chul Soo 731, LEE Young Soo 732, CHOI Min Soo 733 and PARK Jin Soo 734 become the candidate input information 730, respectively. In this instance, the controller 180 can refer to a phonebook stored in the memory 160 for a corresponding keyword to select the candidate input information of the recipient input item from the keywords.

When the candidate input information are displayed on the touchscreen, the user can select KIM Chul Soo, for example. If the user selects KIM Chul Soo, referring to FIG. 7(*d*), KIM Chul Soo is input to the recipient input item 720 and information (i.e., thumbnail) of the photo 710 is input to the content input item. In doing so, the photo information 710 is displayed not on the content input item but on the attachment file input item or can be displayed on both of the input items together.

Figure 8:
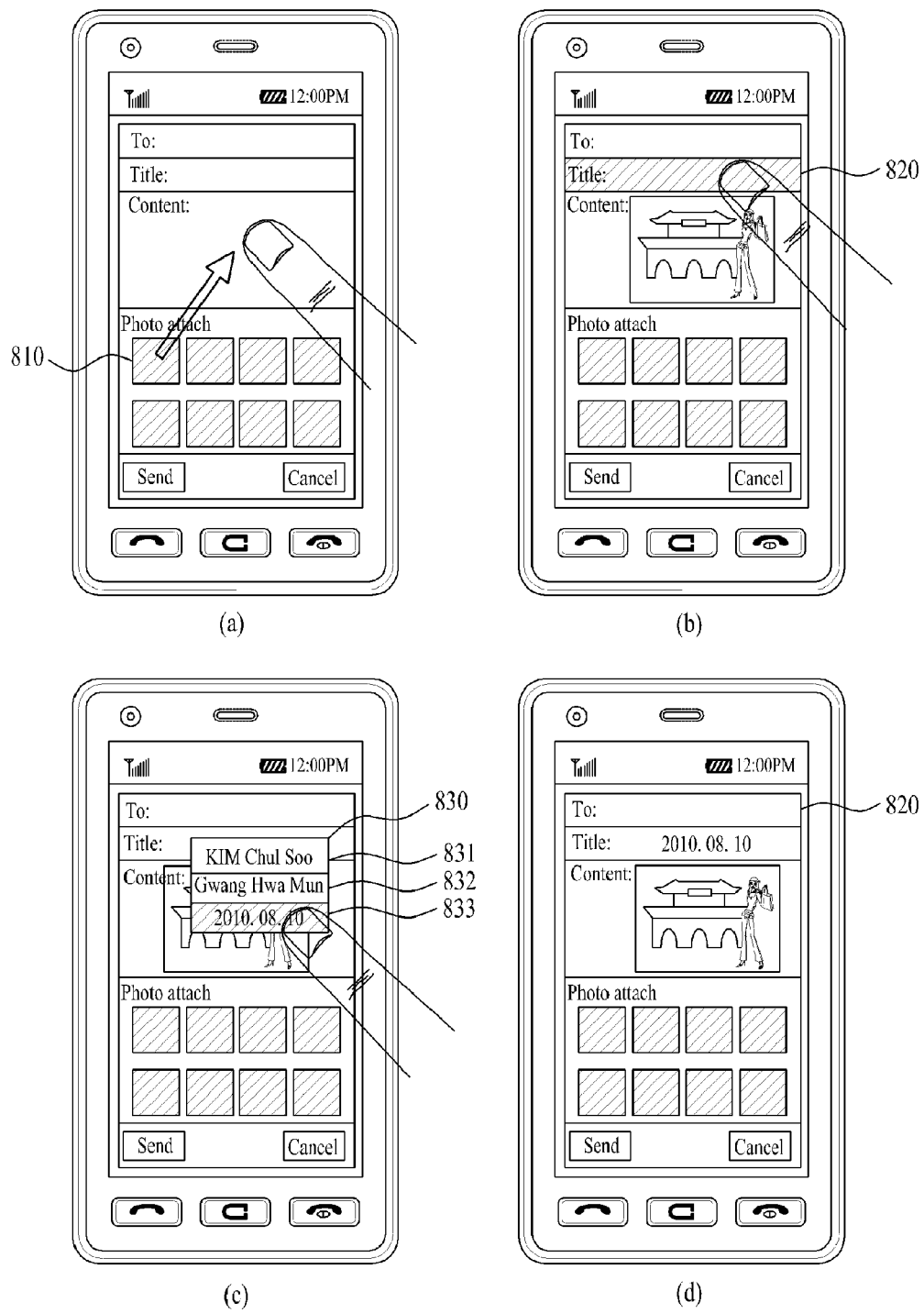
FIG. 8 is a diagram illustrating one example of inputting information to a 'title input item' through candidate input information related to a photo input to 'content input item' according to one embodiment of the present invention.

Next, FIG. 8 is a diagram illustrating one example of inputting information to 'title input item' through candidate input information related to a photo input to 'content input item' according to one embodiment of the present invention.

In the following description, a photo input option is selected as an input option. In addition, input items in an information input mode include a recipient input item, a title input item, a content input item and an originator input item.

Further, the user is writing input items to send a message to which a photo 810 having a file name of '2010.08.10.jpg' is attached. The photo 810 to be input by the user is taken by KIM Chul Soo at Gwang Hwa Mun, 12:00, on Aug. 10, 2010. In this instance, a photograph time information can be stored as metadata or header of a jpg file.

Referring to FIG. 8(a), the user drags and inputs the photo 810 to a content input item of a first input item via a photo input option. After the photo 810 has been input to the content input item, referring to FIG. 8(b), the user selects a title input item 820 of a second input item. Once the title input item 820 is activated, referring to FIG. 8(c), keyword information included in the file name of the photo 810 input to the content input item includes 2010.08.10, 12:00, KIM Chul Soo and Gwang Hwa Mun.

In this instance, KIM Chul Soo 831, Gwang Hwa Mun 832 and 2010.08.10. 833, which are the type information appropriately inputtable to the title input item 820, become the candidate input information 830. When the candidate input information 830 are displayed on the touchscreen, the user can select the 2010.8.10. 833.

If the 2010.08.10. 833 is selected, referring to FIG. 8(d), '2010.08.10.' is input to the title input item 820 and the photo information 810 is input to the content input item.

Figure 9:
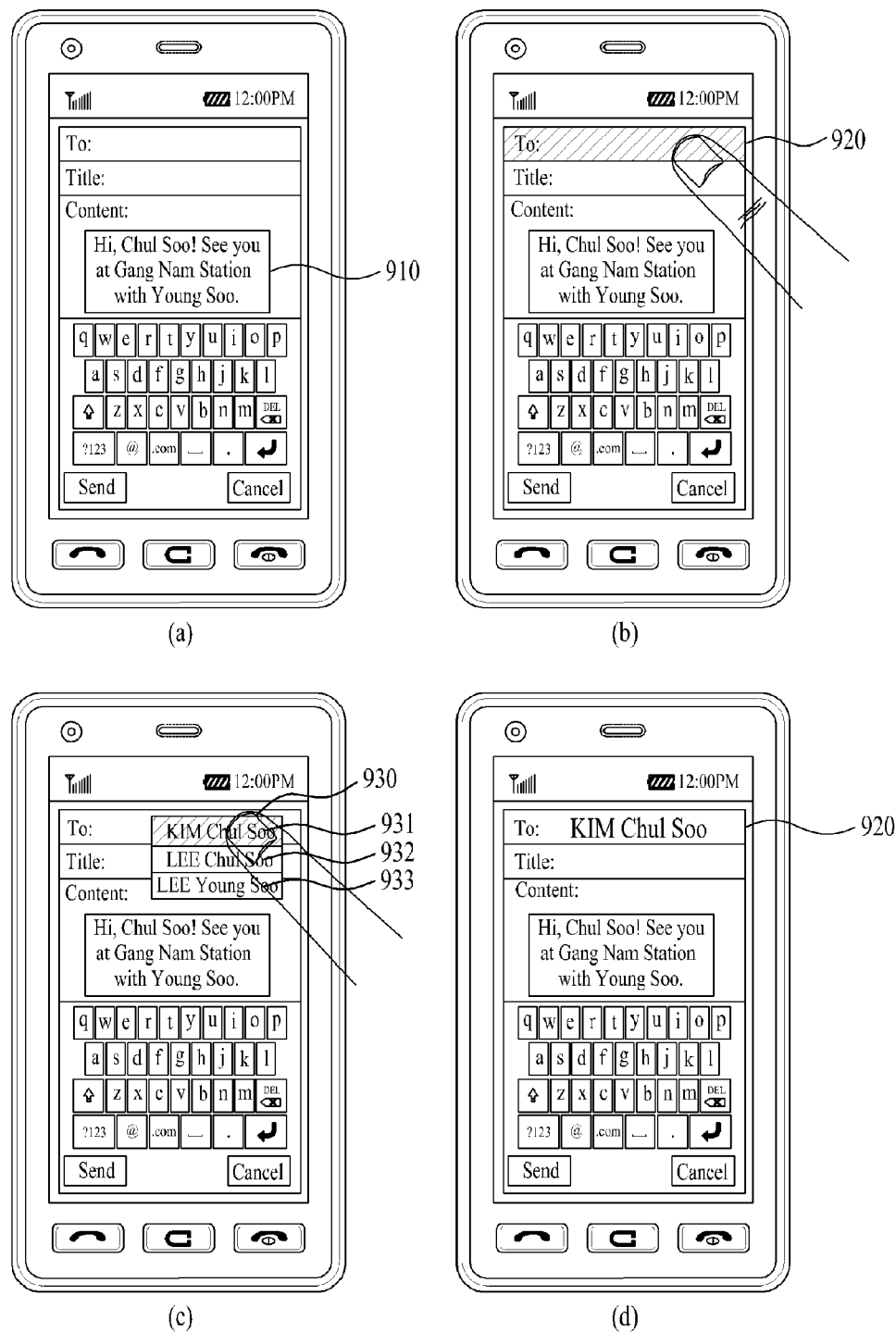
FIG. 9 is a diagram illustrating one example of inputting information to a 'recipient input item' through candidate input information related to content information input to 'content input item' according to one embodiment of the present invention.

In another example, FIG. 9 is a diagram illustrating one example of inputting information to a 'recipient input item' through candidate input information related to a content information input to 'content input item' according to one embodiment of the present invention.

In the following description, a character input option is selected as an input option. In addition, input items in an information input mode include a recipient input item, a title input item, a content input item and an originator input item.

As shown, the user is writing input items to send a message to KIM Chul Soo. Referring to FIG. 9(a), the user is inputting content information to the content input item 910 of a first input item via the character input option. In this instance, referring to FIG. 9(b), the content information is input to the content input item 910. The user then selects a recipient input item 920 of a second input item.

When the recipient input item 920 is selected and activated, referring to FIG. 9(c), keyword information of the content information input to the content input item 910 includes Chul Soo, Gang Nam Station and Young Soo.

In particular, KIM Chul Soo 931, LEE Chul Soo 932 and LEE Young Soo 933, which correspond to the type information suitable for being input to the recipient input item 920 among the keyword information, become candidate input information 930.

When the candidate input information 930 are displayed on the touchscreen, the user can select the KIM Chul Soo 931. If the user selects KIM Chul Soo 931, referring to FIG. 9(d), KIM Chul Soo is input to the recipient input item 920 and text information is input to the content input item 910.

Meanwhile, as mentioned in the foregoing description, although the candidate input information can be displayed on the touchscreen by being classified according to categories, if the candidate input information having high frequency of use is arranged at a top position in consideration of a count of user's information uses, an information input to the second input item can be further facilitated.

A process for arranging candidate input information according to a frequency of use is explained with reference to FIG. 10(a) and FIG. 10(b).

Figure 10:
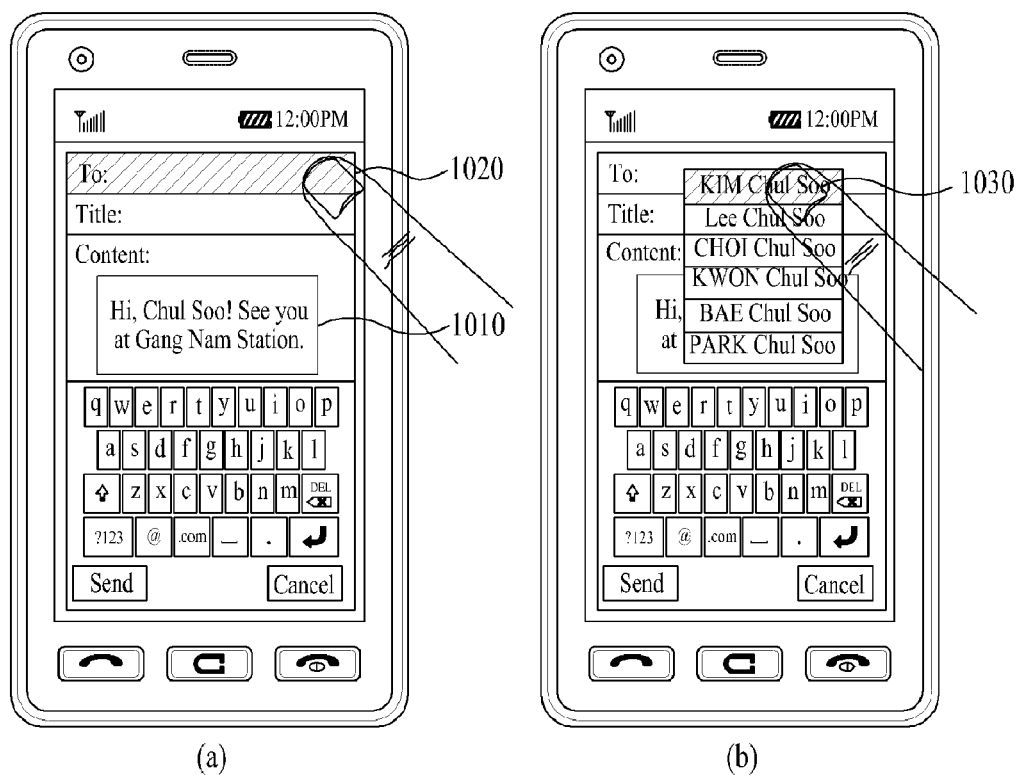
FIG. 10 is a diagram illustrating one example of arranging candidate input information on a 'recipient input item' related to a content information input to 'content input item' according to one embodiment of the present invention.

In particular, FIG. 10 is a diagram illustrating one example of arranging candidate input information on a 'recipient input item' related to a content information input to a 'content input item' according to one embodiment of the present invention.

In the following description, the character input option is selected as an input option. In addition, input items in an information input mode include a recipient input item, a title input item, a content input item and an originator input item.

As shown, the user is writing input items to send a message to KIM Chul Soo. Referring to FIG. 10(a), the user is inputting content information to the content input item 1010 of a first input item via the character input option.

The information is input to the content input item 1010. The user can then select a recipient input item 1020 of a second input item. Referring to FIG. 10(b), keyword information in the content information input to the content input item becomes Chul Soo and Gang Nam Station.

In association with name information inputtable to the recipient input item 1020 among the keyword information, KIM Chul Soo 1031, Lee Chul Soo 1032, CHOI Chul Soo 1033, KWON Chul Soo 1034, BAE Chul Soo 1035 and PARK Chul Soo 1036 are the candidate input information 1030.

The candidate input information 1030 are also displayed in consideration of a user's information use frequency by arranging KIM Chul Soo information having a highest frequency of user's use and PARK Chul Soo information having a lowest frequency of the user's use at the top and bottom respectively. In this instance, the use frequency is just exemplary, by which the present invention is non-limited. For instance, a priority per group, an order of A, B and C, an order of a recent use and the like can be applied to a sorting reference.

If the candidate input information 1030 are displayed on the touchscreen, the user can select KIM Chul Soo 1031 and then easily input information to the recipient input item.

Third Embodiment

According to a further embodiment of the present invention, if information for a second input item is input to a first input item, the information is input to a second input item and information for the first input item among information related to the input information can be input to the first input item.

In this instance, the first input item means a single item that is initially input among a plurality of input items. In addition, the second input item means at least one input item among a plurality of the input items except the first input item.

Generally, if information of an unsuitable type is input to an input item, it is recognized an erroneous input. Therefore, the input information is nullified or an error message is output. If the input unsuitable information is converted to information of a suitable type or the information is input to a suitable input item, a user can more easily write a message.

In the following description, when inputting information for a second input item to a first input item, a method of processing the input information will be explained with reference to FIGS. 11(a) and 11(b).

Figure 11:
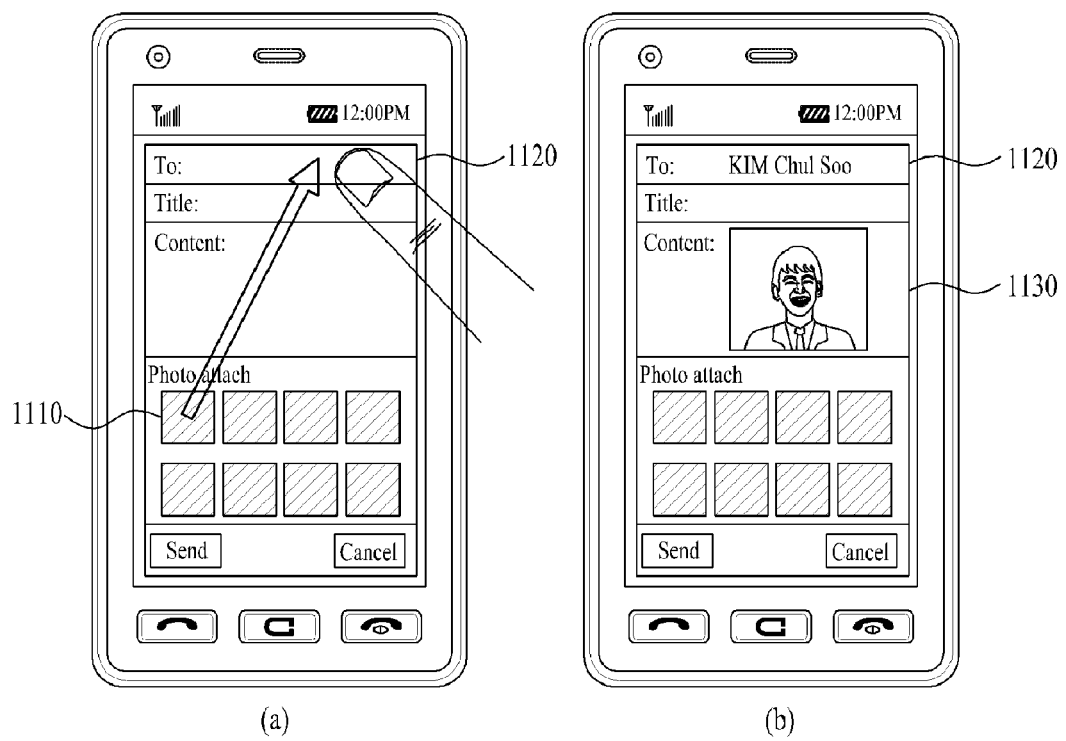
FIG. 11 is a diagram illustrating one example of a processing method if a photo for 'content input item' is input to 'recipient input item' according to one embodiment of the present invention.

In particular, FIG. 11 is a diagram illustrating one example of a processing method if a photo for 'content input item' is input to 'recipient input item' according to one embodiment of the present invention.

In the following description, the photo input option is selected as an input option. In addition, input items in an information input mode include a recipient input item, a title input item, a content input item and an originator input item.

As shown, the user is writing input items to send KIM Chul Soo a message to which a photo 1110 is attached. In this instance, the photo 1110, which is to be input by the user, is the photo of KIM Chul Soo taken at Gwang Hwa Mun, Aug. 10, 2010.

Referring to FIG. 11(a), the user drags the photo 1110 to a recipient input item 1120 via a photo input option. Since an input item, to which an information of the photo 1110 is inputtable, is a content input item 1130, and if the photo 1110 is input to the recipient input item 1120, this corresponds to a situation that information of an unsuitable type is input to a second input item.

Referring to FIG. 11(b), the initially input photo information is input not to the recipient input item 1120 but automatically to the content input item 1130. In addition, the input photo information can be input by being converted to a name information for the recipient input item 1120.

The input photo information includes 'KIM Chul Soo', 'Gwang Hwa Mun' and '2010.08.10' information. KIM Chul Soo name information inputtable to the recipient input item 1120 among the information is thus input to the recipient input item 1120.

The input photo 1110 is input to the content input item 1130. In addition, the input photo 1110 is converted to KIM Chul Soo name information and is then input to the recipient input item 1120. This is more convenient to the user.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate with at least one other terminal;
a touchscreen configured to display an input menu for inputting information, said input menu including at least one input option being displayed as a thumbnail representing input items that can be selected; and
a controller configured to receive a first selection signal indicating a selection of the at least one input option, to expand and display in a first display region on the touchscreen the at least one input option so as to display the input items that can be selected, to display in a second display region on the touchscreen at least first and second input fields used when transmitting an input item, to receive a second selection signal indicating an input of the input item to be transmitted to the at least one other terminal into the first input field, to receive a third selection signal indicating a selection of the second input field, and to automatically provide candidate options to be input into the selected second input field based on characteristics of the input item input into the first input field.

2. The mobile terminal of claim 1, wherein the first input field is a content input field for inputting content to be transmitted to the at least one other terminal, and the second field includes a recipient name of the at least one other terminal.

3. The mobile terminal of claim 1, wherein the characteristics of the input item are extracted from a file name of the input item, a title of the input item, a location corresponding to the input item, a date/time corresponding to the input item, a file date of the input item, character information included in the input item, header information included in the input item and metadata related to the input item.

4. The mobile terminal of claim 1, wherein the controller is further configured to receive a fourth selection signal indicating a selection of a candidate option among the provided candidate options, and to input the selected candidate option into the second input field.

5. The mobile terminal of claim 1, wherein the controller is further configured to display the at least one input option represented as the thumbnail while the touchscreen is in a lock screen state.

6. The mobile terminal of claim 1, wherein the at least one input option includes a photograph thumbnail representing a plurality of photograph input items, a character thumbnail representing a character key pad input item, a video thumbnail representing a plurality of video input items, and a recording thumbnail indicating a plurality of recording input items.

7. The mobile terminal of claim 1, wherein the controller is further configured to display the plurality of candidate options based a prescribed sorting reference.

8. The mobile terminal of claim 7, wherein the prescribed sorting reference includes at least one of a use frequency, a priority per phonebook group, an alphabetic order and a recent use order.

9. The mobile terminal of claim 1, wherein when the input item is erroneously input to the second input field, the controller is further configured to automatically input the input item into the correct first input field, extract information corresponding to the input item, and to input the extracted information into the second input field.

10. The mobile terminal of claim 6, wherein when the character key pad input item is expanded and displayed in the first display region, and characters are input into the first input field, the extracted characteristics of the input item correspond to characters extracted from the characters input into the first input field.

11. A method of controlling a mobile terminal, the method comprising:
allowing, via a wireless communication unit of the mobile terminal, wirelessly communication with at least one other terminal;
displaying, on a touchscreen of the mobile terminal, an input menu for inputting information, said input menu including at least one input option being displayed as a thumbnail representing input items that can be selected;
receiving, via a controller of the mobile terminal, a first selection signal indicating a selection of the at least one input option;
expanding and displaying, via the controller, in a first display region on the touchscreen the at least one input option so as to display the input items that can be selected;

displaying, via the controller, in a second display region on the touchscreen at least first and second input fields used when transmitting an input item;

receiving, via the controller, a second selection signal indicating an input of the input item to be transmitted to the at least one other terminal into the first input field, and a third selection signal indicating a selection of the second input field; and automatically providing, via the controller, candidate options to be input into the selected second input field based on characteristics of the input item input into the first input field.

12. The method of claim 11, wherein the first input field is a content input field for inputting content to be transmitted to the at least one other terminal, and the second field includes a recipient name of the at least one other terminal.

13. The method of claim 11, wherein the characteristics of the input item are extracted from a file name of the input item, a title of the input item, a location corresponding to the input item, a date/time corresponding to the input item, a file date of the input item, character information included in the input item, header information included in the input item and metadata related to the input item.

14. The method of claim 11, further comprising:

receiving, via the controller, a fourth selection signal indicating a selection of a candidate option among the provided candidate options, and inputting the selected candidate option into the second input field.

15. The method of claim 11, further comprising:

displaying, via the controller, the at least one input option represented as the thumbnail while the touchscreen is in a lock screen state.

16. The method of claim 11, wherein the at least one input option includes a photograph thumbnail representing a plurality of photograph input items, a character thumbnail representing a character key pad input item, a video thumbnail representing a plurality of video input items, and a recording thumbnail indicating a plurality of recording input items.

17. The method of claim 11, further comprising:

displaying, via the controller, the plurality of candidate options based a prescribed sorting reference.

18. The method of claim 17, wherein the prescribed sorting reference includes at least one of a use frequency, a priority per phonebook group, an alphabetic order and a recent use order.

19. The method of claim 11, wherein when the input item is erroneously input to the second input field, the method further comprises automatically inputting the input item into the correct first input field, extracting information corresponding to the input item, and inputting the extracted information into the second input field.

20. The method of claim 16, wherein when the character key pad input item is expanded and displayed in the first display region, and characters are input into the first input field, the extracted characteristics of the input item correspond to characters extracted from the characters input into the first input field.

* * * * *